United States Patent Office 2,783,267
Patented Feb. 26, 1957

2,783,267

PROCESS OF MAKING METHYLENE-BIS-AMINO-CARBOXYLIC-ACID NITRILES

Rudolf Lotz, Klingenberg (Main), Germany, assignor to Vereinigte Glanzstoff - Fabriken Aktiengesellschaft, Wuppertal-Elberfeld, Germany, a joint-stock company under German law No Drawing. Application December 30, 1953, Serial No. 401,361

Claims priority, application Germany February 5, 1953

4 Claims. (Cl. 260—465.5)

This invention relates to a process of producing methylene-bis-aminocarboxylic acid nitriles.

I have discovered that a mixture of acrylic acid nitrile or an α-substituted methyl or chloro derivative thereof will react in the gas phase with formaldehyde or substances splitting off formaldehyde such as, for instance, paraformaldehyde or hexamethylenetetramine, and with gaseous ammonia to yield a methylene-bis-aminocarboxylic acid nitrile.

I prefer to carry out this reaction in an oven and in a reaction tube of suitable dimensions at temperatures up to 400° C. and more especially within the range of 350° and 380° C. under atmospheric pressure.

Formaldehyde may be used in solution or as paraformaldehyde. I have found it useful to carry through the reaction in the presence of inert gases and of certain catalysts.

As catalysts I have found useful boronphosphate, aluminum oxide, zinc oxide or large-surface materials such as for instance clay fragments, either alone or mixed with one another. The catalysts are preferably distributed as a powder on a sieve within the oven, but they may also form a lining on the oven or tube wall.

Starting for instance from acrylic acid nitrile, formaldehyde and ammonia gas and introducing these materials under the conditions above set out into an oven, an oily product will first be formed, and if this product is then distilled at 140° under 10 mm. Hg pressure, there forms methylene-bis-β-aminopropionic acid nitrile having the formula $$NC.CH_2.CH_2.NH.CH_2.NH.CH_2.CH_2.CN$$

This compound has been found to be an important intermediate product for the production of artificial materials.

In the practical performance of my invention I have, for instance, proceeded as follows:

Example 1

240 g. acrylic acid nitrile and 220 g. formaldehyde of 35% were gradually dripped within 3–5 hours into a reaction vessel in an oven five feet in length, heated by electricity to 350°–400° C. A mixture of boronphosphate and aluminum oxide was finely distributed on a sieve mounted in the oven. Ammonia gas was introduced into the reaction vessel at the rate of 25 l. per hour. After five hours there was separated out in the receiver an oily product which, on having been subjected to distillation in vacuo at 140° and 10 mm. Hg pressure, was found to be methylene-bis-β-aminopropionic acid nitrile of the formula $$NC.CH_2.CH_2.NH-CH_2-NH.CH_2.CH_2.CN$$

Example 2

114 g. methacrylic acid nitrile, 900 g. formaldehyde of 35% and 25 l. per hour of ammonia gas were passed during five hours through an electrically heated tube filled with a boronphosphate and aluminum-oxide catalyst, the temperature being 350° C. After 5 hours an oily product had accumulated in the receiver. On distilling same at about 150° and 10 mm. Hg pressure there was obtained a dinitrile, being methylene-bis-(β-amino-α-methyl) propionic acid nitrile having the formula $$\underset{CH_3}{NC.CH.CH_2.NH-CH_2-NH.CH_2.CH.CN}\underset{CH_3}{\phantom{X}}$$

Example 3

240 g. acrylic acid nitrile and 100 g. formaldehyde, obtained by splitting about 350 g. paraformaldehyde by heating to 135°–180° C., were introduced during 3–5 hours from a vessel into the reaction container heated electrically to 350°–400°. A mixture of boronphosphate and aluminum oxide was used as catalyst. Together with the formaldehyde current, ammonia was introduced at the rate of 25 l. per hour. After 5 hours there was found in the receiver an oil which, on being subjected to distillation at 140° under 10 mm. Hg pressure, yielded methylene-bis-β-aminopropionic acid nitrile $$NC.CH_2.CH_2.NH-CH_2-NH.CH_2.CH_2.CN$$

Various changes may be made in the starting products and in the conditions of reaction without departing from the invention or sacrificing the advantages thereof.

I claim:

1. The process of producing methylene-bis-aminocarboxylic acid nitriles $$\underset{R}{NC.CH.CH_2.NH.CH_2.NH.CH_2.CH.CN}\underset{R}{\phantom{X}}$$

wherein R is a variable selected from the group consisting of H, CH₃, Cl, comprising reacting a compound selected from the group consisting of nitriles of acrylic acid and the α-substituted methyl and chloro derivatives thereof with formaldehyde and ammonia in the gas phase at a temperature, where the reactants exist in the gas phase.

2. The process of producing methylene-bis-aminocarboxylic acid nitriles $$\underset{R}{NC.CH.CH_2.NH.CH_2.NH.CH_2.CH.CN}\underset{R}{\phantom{X}}$$

wherein R is a variable selected from the group consisting of H, CH₃, Cl, comprising reacting a compound selected from the group consisting of nitriles of acrylic acid and the α-substituted methyl and chloro derivatives thereof with formaldehyde and ammonia in the gas phase at a temperature ranging between 350° and 380° C.

3. The process of claim 1 carried out in the presence of a catalyst selected from the group consisting of boronphosphate, aluminum oxide, zinc oxide, clay fragments and mixtures thereof.

4. The process of claim 1, in which the formaldehyde is obtained by the splitting of a substance of the group consisting of paraformaldehyde and hexamethylenetetramine.

References Cited in the file of this patent

UNITED STATES PATENTS

| | | |
|---|---|---|
| 2,228,271 | Jacobson et al. | Jan. 14, 1941 |
| 2,448,013 | Buc et al. | Aug. 31, 1948 |
| 2,483,513 | Allen et al. | Oct. 4, 1949 |

FOREIGN PATENTS

| | | |
|---|---|---|
| 613,807 | Great Britain | Dec. 3, 1948 |

OTHER REFERENCES

McElvain et al.: J. Am. Chem. Soc., vol. 73, page 449 (1951).